Figure 1:
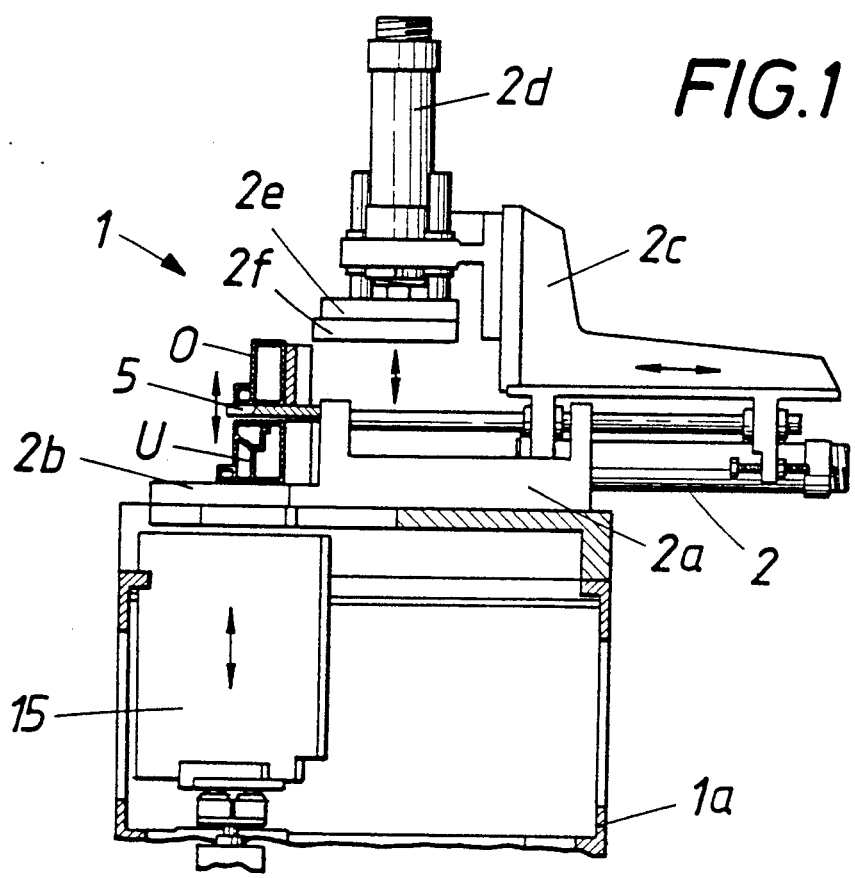

United States Patent [19]

Ganzberger

[11] Patent Number: 4,995,935
[45] Date of Patent: Feb. 26, 1991

[54] WELDING MACHINE FOR BUTT WELDING OF PLASTIC PROFILES

[76] Inventor: Walter Ganzberger, Ziehbergstrasse 48, A-4053 Haid, Austria

[21] Appl. No.: 347,497

[22] Filed: May 4, 1989

[30] Foreign Application Priority Data

May 4, 1988 [AT] Austria ................................. 1157/88

[51] Int. Cl.⁵ .......................... B25B 1/20; B29C 65/20
[52] U.S. Cl. .................................... 156/499; 29/281.5;
156/304.2; 156/304.6; 156/507; 156/557;
156/580; 156/583.1; 269/41; 269/43
[58] Field of Search ............... 156/304.1, 304.2, 304.6,
156/499, 507, 577, 580, 583.6, 583.1; 269/41,
43; 29/281.5

[56] References Cited

U.S. PATENT DOCUMENTS

| | | | |
|---|---|---|---|
| 4,239,574 | 12/1980 | Aust et al. | 156/507 |
| 4,828,239 | 5/1989 | Grandy et al. | 269/41 |
| 4,909,892 | 3/1990 | Quinn et al. | 156/499 |

Primary Examiner—Michael G. Wityshyn
Attorney, Agent, or Firm—Kurt Kelman

[57] ABSTRACT

A welding machine for butt welding of plastic profiles is outfitted with profile clamping units (2, 3) capable of sliding in relation to each other, and a heat reflector (15) which can be introduced between the front surfaces of two profiles to be welded, whereby the clamping units (2, 3) comprise weld boundary blades (2b, 2f, 3b, 3f) aligned parallel to the profile front surfaces and mounted on the profiles.

In order to enhance welding efficiency and produce precisely coordinated weld joints, the clamping units (2, 3) are designed to accommodate two superimposed profiles (U, O), and feature in addition to the external boundary blades (2b, 2f, 3b, 3f) an intermediate boundary blade (5, 6) insertable between the profiles (U, O), yielding elastically in the clamping direction of the profiles and moving along with the clamping units (2, 3) in the direction of displacement.

6 Claims, 3 Drawing Sheets

WELDING MACHINE FOR BUTT WELDING OF PLASTIC PROFILES

The invention relates to a welding machine for the butt welding of plastic profiles, in particular, window frame profiles, having profile clamping units which are movable relative to each other and a heat reflector which can be inserted between the front surfaces of two profiles to be welded, whereby the clamping units comprise weld boundary blades which are directed in parallel to the profile front surfaces and which can be attached to the profiles.

Profiles made of thermoplastic materials, preferably extruded polyvinyl chloride profiles, are generally joined to each other by butt welding in order to manufacture windows, doors, frames, and like prefabricated pieces, for which purpose two- or four head welding machines of varying designs already exist. In these welding machines two profiles per welding head are welded together, whereby the profiles securely clamped in the profile clamping units, through corresponding movement of the profile clamping units, are pressed on the front side against a heat reflector placed in the feeding path of the clamping units until the profiles are fused together and, upon removal of the heat reflector, the plastified profile front surfaces are subsequently pressed together. The weld boundary blades arranged at a suitable distance from the profile front surfaces ensure a clean weld formation and delimit the joining path required for a proper welded joint, which path results when the profile front surfaces are pressed together. Depending on the number of welding heads, two or four welded joints can be simultaneously produced in this fashion, which welded joints, however, must be located on the very same workpiece. Owing to the fabrication tolerances which cannot be avoided in butt welding, it has heretofore not been possible to achieve an exact, mutual matching up of two workpieces belonging together, for example, the matching up of the sash and stock frame of a window or a door and, moreover, the welding capacity of the welding machines known in the art, solely because of the time intervals which must be adhered to for heating up, pressing together and cooling down of the profiles, is limited.

The task of the invention, consequently, is to overcome these deficiencies and to create a welding machine of the kind described at the outset which ensures a particularly economical butt welding of plastic profiles and which, in addition thereto, enables the fabrication of workpieces exactly matched to each other.

The invention resolves this task in that the clamping units are adapted to receive two superposed profiles, preferably a sash and a stock or casing frame, and exhibit, in addition to the external boundary blades, an intermediate boundary blade which can be inserted between the profiles, which blade yields elastically in the clamping direction of the profiles and moves along with the clamping units in the direction of displacement, providing support. Because each clamping unit is able to clamp two profiles, two welded joints, instead of one, can be produced simultaneously per welding head with little additional expenditure, whereby the same conditions with respect to heat treatment, applied pressure, welding times and, above all, welding and joining paths as well, apply and, consequently, two exactly matching workpieces result from the welding. The intermediate boundary blade assures a proper weld formation even in the lateral areas intervening between the profiles, whereby the elasticity of the blade support guarantees the correct clamping of both profiles such that, despite the doubling of welding capacity which may be achieved thereby, no compromise in welding quality is to be feared.

A particularly expedient design results if, according to the invention, one of the intermediate boundary blades of two clamping units allocated to each other is firmly seated on a common carrier track running parallel to the clamping plane and preferably parallel to one of the profiles, and the other intermediate boundary blade is displaceable against the force of a return spring on said common carrier track which, in turn, moves supporting itself against the force of a supporting spring normal to the clamping plane on a bearing block connected to the one clamping unit, whereby the other clamping unit exhibits an engaging cam for the displaceable intermediate boundary blade. By virtue of this combination of both intermediate boundary blades, only one of the clamping units need be outfitted with the intermediate boundary blades at any one time, such that, above all, advantageous utilization of space and easy synchronization of the intermediate boundary blades results, on the one hand by means of the supporting clamping unit itself and, on the other, by means of an appropriate engaging cam.

Where the engaging cam consists of an eccentric which is pivotable about a normal axis to the clamping plane, by adjusting this eccentric the area of synchronization can be varied and, consequently, the intermediate boundary blades adapted to varying profile dimensions or the distance of the intermediate boundary blade from the profile front surfaces preselected.

According to an advantageous further development of the invention, the bearing block is mounted on an elevating cylinder which is preferably oriented parallel to the profile front surfaces and braced on the clamping unit via a bracket or the like, whereby the extension and retraction of the elevating cylinder positions the intermediate boundary blades or moves them into a disengaged position enabling the profiles to be freely inserted or removed.

According to the invention two superposed positioning pins which are extendable and retractable by means of the elevating cylinder in order to determine the insert position of the superposed profiles can also be supported on the bracket. These positioning pins, during the insertion and clamping of the profiles to be welded, enable the desired initial positions to be maintained for all profiles, with that result that uniform welding of the superposed profiles is assured.

Figure 2:
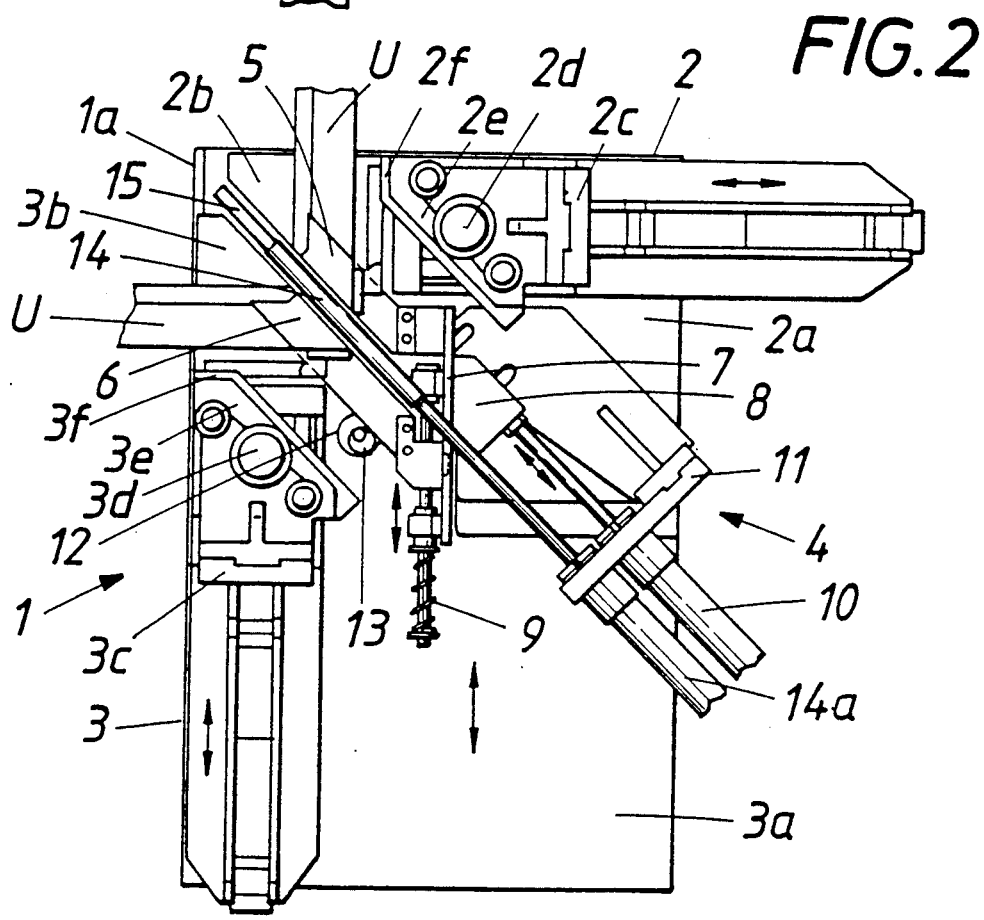
Figure 3:
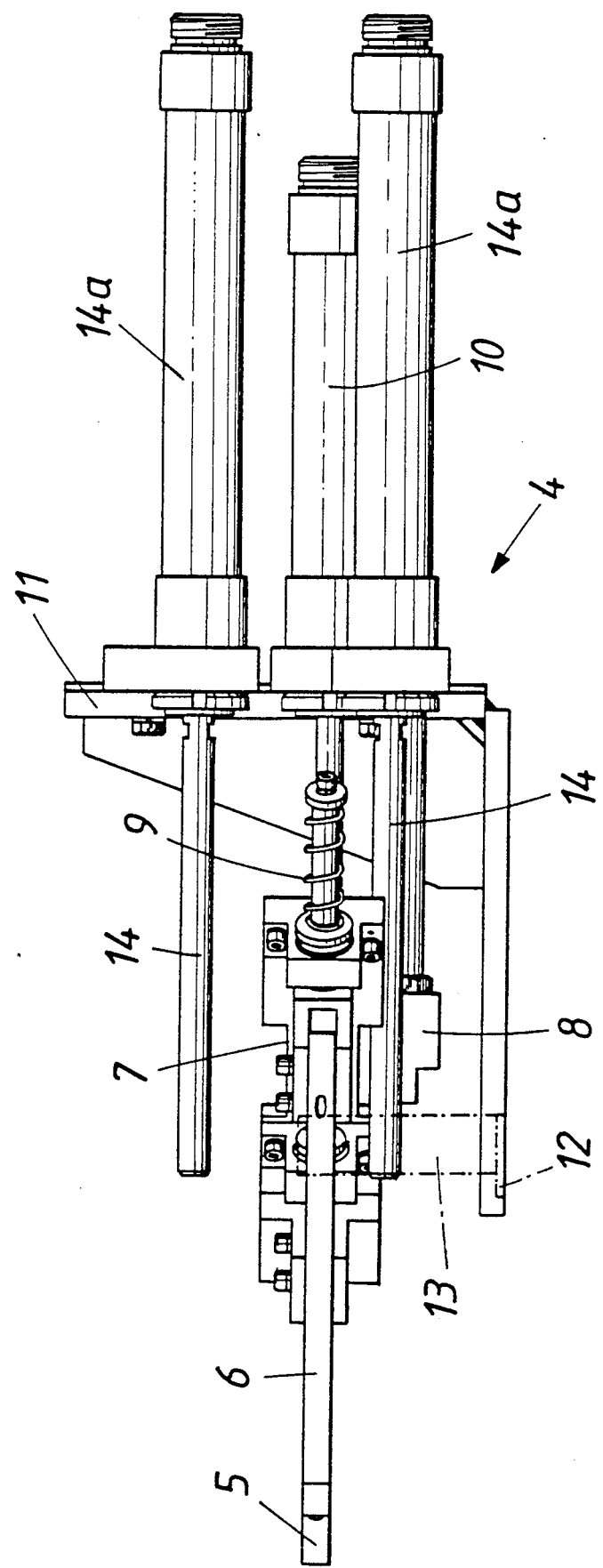
Figure 4:
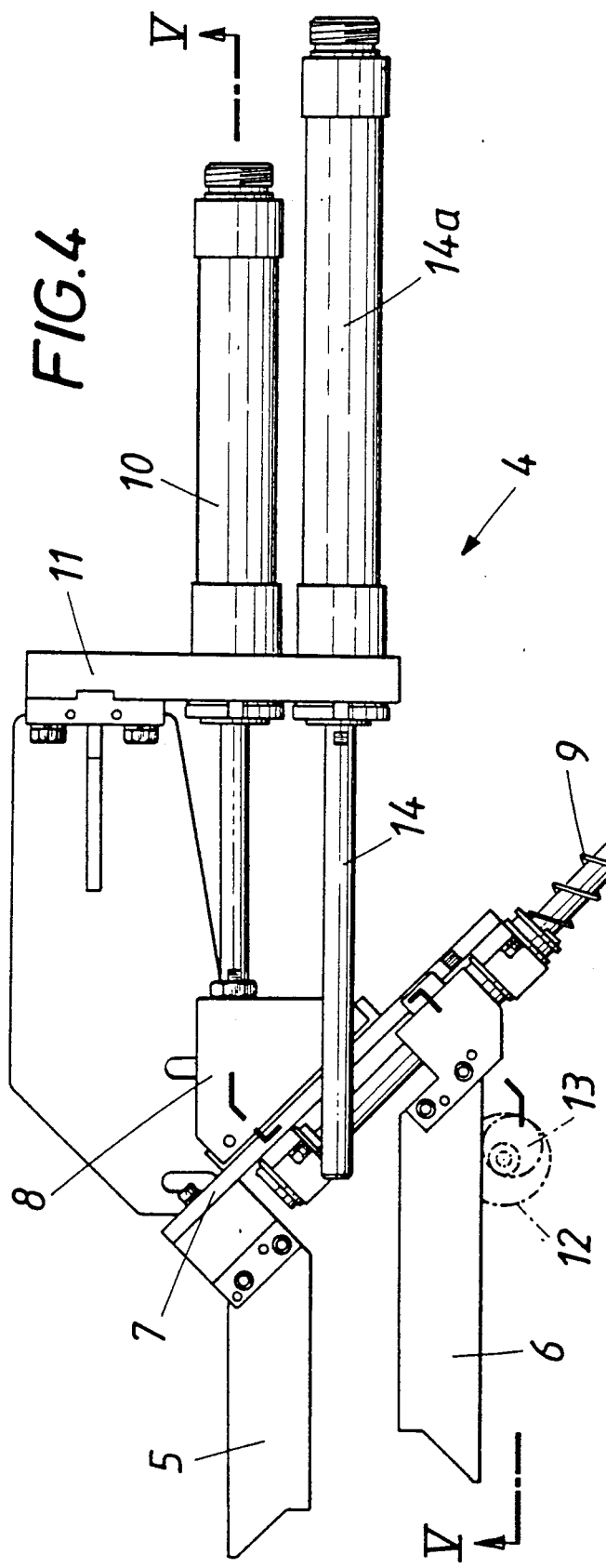
Figure 5:
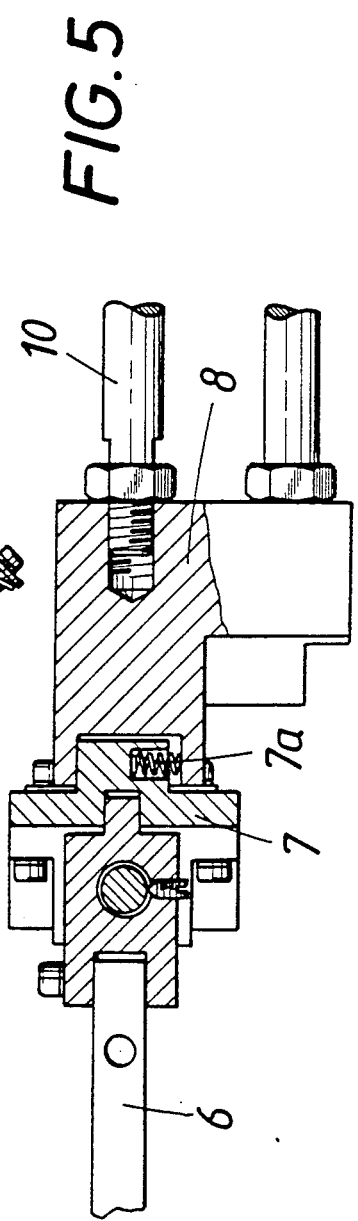

A purely schematic embodiment of the object of this invention is illustrated in the drawing, wherein FIGS. 1 and 2 show a cut-out side view and a top view of the welding head of a welding machine according to the invention, FIGS. 3 and 4 show a side view and a top view of the intermediate boundary blade device of such welding head, and FIG. 5 is a sectional view along the V—V line in FIG. 4.

A welding head 1 of a not otherwise illustrated two-head or four-head welding machine for butt welding of plastic profiles features two profile clamping units 2, 3 aligned at a 90-degree angle to each other, consisting of a bearing plate 2a, 3a with a lower weld boundary blade 2b, 3b and a clamping slide 2c, 3c, capable of displacement relative to the bearing plate 2a, 3a, which slide accommodates a pressure plate 2e, 3e, compression-charged by way of a clamping cylinder 2d, 3d having an upper weld boundary blade 2f 3f. One of the clamping units 2 is fixed onto the machine frame 1a, while the other clamping unit 3 is mounted displaceably on the machine frame 1a.

The two clamping units 2, 3 are designed to clamp two superimposed profiles U, O whereby provision is made for an intermediate boundary blade device 4, comprising two intermediate boundary blades 5, 6 associated with the clamping units 2, 3, insertable between the superimposed profiles U, O. THe intermediate boundary blade 5 is mounted stationary on the carrier rail 7 aligned parallel to the clamping unit 3, which rail in its turn is supported by a bearing block 8, being movable in the operating direction of the clamping cylinder 2d, 3d against the force of a spring support 7a, while the other intermediate boundary blade 6 is longitudinally displaceable on carrier rail 7 against the force of a reset spring 9. The bearing block is arranged on a bracket 11, being capable of in and out movement in the direction of the intermediate boundary blades 5, 6 by way of a lifting cylinder 10, which console securely links the entire intermediate boundary blade device 4 with the clamping unit 2. The other clamping unit 3 features an engagement lug 12 for the relative displacement of the two intermediate boundary blades 5, 6, consisting of an eccentric cam 13 projecting up from the bearing plate 3a and capable of rotary displacement. In addition to the intermediate boundary blades 5, 6 the bracket 11 supports stop pins 14 arranged above and below such blades, which are capable of advancing and retracting with the aid of their own lifting cylinders 14a parallel to the bearing block 8. The welding head 1 affords particularly efficient butt welding of plastic profiles, as it permits simultaneous production of two welded joints for overlapping profiles U, O, thus allowing interrelated work pieces such as casement wings and casing frames of windows and doors to be produced at the same time and precisely aligned with each other. To insert the profiles for welding, the clamping units 2, 3 are spread out to their insert position, while the slides 2c, 3c are retracted. When the lifting cylinder 10 is raised, the intermediate boundary blades 5, 6 are also retracted, so that the bottom profiles U, for example the profiles for casement frames can be freely inserted into the clamping units 2, 3, whereby the extended stop pins 14 permit precise retention of the clamping position. The intermediate boundary blades 5, 6 extend outward and onto the lower profiles U, already inserted, suitably spaced away from the bevel-cut profile front surfaces (FIG. 2). At this time, it is possible to superimpose the next two profiles O, for example the profiles of a casing frame, onto the lower profiles U and the intermediate boundary blades 5, 6, whereby the upper stop pin 14 again determines the precise clamping position. Once the profiles U, O are so inserted, the slides 2c, 3c advance to the clamping position and by the activation of the clamping cylinders 2d, 3d the profiles U, O are clamped between the bearing plates 2a, 3a with the lower weld boundary blade 2b, 3b on the one hand, and the pressure plates 2e, 3e with the upper boundary blade 2f, 3f on the other hand, as well as with the intermediate boundary blades 5, 6 yielding elastically to the appropriate extent. The stop pins 14 retract leaving free the interspace between the profile front surfaces, so that the heat reflector 15 mounted beneath the clamping units 2, 3 may be inserted between the profiles U, O. The clamping unit 3 is pushed forward pressing the profile front surfaces against the heat reflector 15, until the plastic material is suitably plasticized, at which time the heat reflector 15 descends once again after the clamping unit 3 has retracted, and the clamping unit 3 once more moves forward for the actual welding process, so that the profiles U, O with their plasticized frontal surfaces are directly pressed together. In these displacements of the clamping unit 3, the lug 12, engaging the displaceable intermediate boundary blade 6, causes the blade 6 to move along with the profiles U, O in the clamping unit 3. The end position and the range of travel of the intermediate boundary blade 6 may be adjusted by rotating the eccentric cam 13. Once the profiles U, O are pressed together, the clamping cylinders 2d, 3d are relieved of load, the clamping units 2, 3 open up and move back to the starting position. The welded upper profiles O may be freely removed from the welding head 1, whereupon the intermediate boundary blades 5, 6 are retracted and the lower welded profiles U can also be removed without difficulty.

Thus, in one common operating step, the superimposed profiles are welded to each other, ensuring a particularly efficient welding process and above all a precisely identical welding joint for the two simultaneously welded work pieces.

I claim:

1. A welding machine for butt welding of two pairs of superimposed plastic profiles respectively having an upper surface, a lower surface and surfaces extending in parallel planes to be welded together, comprising
    (a) two associated clamping units, one clamping unit being capable of sliding relative to the other clamping unit in a first sliding direction, each clamping unit being designed to accommodate a pair of superimposed plastic profiles inserted therein and including
        (1) two external weld boundary blades respectively engaging the upper and lower surfaces of the superimposed plastic profiles, and
        (2) an intermediate weld boundary blade movable in a second sliding direction aligned parallel to the surfaces to be welded together, the intermediate weld boundary blade being insertable between the superimposed plastic profiles to be welded together and yielding elastically in the direction extending perpendicularly to the upper and lower surfaces, wherein the intermediate weld boundary blade associated with said one clamping unit is fixed relative to the first sliding direction while the intermediate weld boundary blade associated with the other clamping unit is displaceable in said first sliding direction against the bias of a reset spring,
    (b) a bearing block connected to one of the two associated clamping units,
    (c) a carrier rail for the displaceable intermediate weld boundary blade, the carrier rail being supported on the bearing block,
    (d) a spring support arranged between the bearing block and the carrier rail, the spring support biasing the carrier rail for moving the carrier rail in the direction extending perpendicularly to the upper and lower surfaces,
    (e) an entrainment lug mounted on the other one of the two associated clamping units and engaging the displaceble intermediate weld boundary blade, and (f) a heat reflector insertable between the surfaces to be welded together.

2. The welding machine of claim 1, wherein the carrier rail extends parallel to one of the plastic profiles.

3. The welding machine of claim 1, wherein the entrainment lug is an eccentric cam capable of rotary displacement about an axis extending perpendicularly to the upper and lower surfaces.

4. The welding machine for claim 1, further comprising an actuating cylinder for displacing the bearing block, bracket means connecting the actuating cylinder to the one clamping unit, and the bearing block being secured to the actuating cylinder.

5. The welding machine of claim 4, wherein the actuating cylinder extends in said second siding direction.

6. The welding machine of claim 4, further comprising two superimposed stop pins supported on the bracket means, the stop pins being reciprocable into an insert position for alignment of the superimposed profiles, and actuating cylinders connected to the stop pins for reciprocation thereof.

* * * * *